United States Patent
Hyland et al.

(10) Patent No.: US 10,119,474 B2
(45) Date of Patent: Nov. 6, 2018

(54) VIBRATION DAMPING APPARATUS FOR HYDROSTATIC SEAL OF GAS TURBINE ENGINE

(71) Applicant: United Technologies Corporation, Hartford, CT (US)

(72) Inventors: Dave J. Hyland, Farmington, CT (US); Joseph T. Caprario, Cromwell, CT (US); Timothy Dale, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 510 days.

(21) Appl. No.: 14/766,192

(22) PCT Filed: Dec. 18, 2013

(86) PCT No.: PCT/US2013/075978
§ 371 (c)(1),
(2) Date: Aug. 6, 2015

(87) PCT Pub. No.: WO2014/143284
PCT Pub. Date: Sep. 18, 2014

(65) Prior Publication Data
US 2016/0069269 A1    Mar. 10, 2016

Related U.S. Application Data

(60) Provisional application No. 61/800,075, filed on Mar. 15, 2013.

(51) Int. Cl.
*F02C 7/28* (2006.01)
*F01D 25/04* (2006.01)
(Continued)

(52) U.S. Cl.
CPC .............. *F02C 7/28* (2013.01); *F01D 11/001* (2013.01); *F01D 11/025* (2013.01); *F01D 19/00* (2013.01);
(Continued)

(58) Field of Classification Search
CPC ...... F01D 11/025; F01D 11/001; F01D 11/00; F01D 11/003; F01D 25/04; F01D 25/22;
(Continued)

(56) References Cited

U.S. PATENT DOCUMENTS 4,426,087 A    1/1984    Sargent et al.
6,918,739 B2    7/2005    Addis
(Continued)

FOREIGN PATENT DOCUMENTS

EP    1312764 A2    5/2003
GB    2092243 A    8/1982
JP    11-257014 A    9/1999

OTHER PUBLICATIONS

European Search Report for Application No. EP 13 87 8455.
International Search Report Application No. PCT/US2013/075978; dated Mar. 28, 2014.

*Primary Examiner* — Mark Laurenzi
*Assistant Examiner* — Mickey France
(74) *Attorney, Agent, or Firm* — Cantor Colburn LLP

(57) ABSTRACT

A hydrostatic seal and vibration damping apparatus for a gas turbine engine adapted to reduce vibrations during cold engine start-ups is disclosed. In one disclosed configuration, the vibration damping apparatus is comprised of a temperature sensitive control ring having a relatively high coefficient of thermal expansion adapted to expand quickly at relatively low temperatures to protect the hydrostatic seal during such gas turbine engine startups. At operational temperatures, the control ring is adapted to become separated from the hydrostatic sea.

17 Claims, 5 Drawing Sheets

(51) Int. Cl.
  *F16J 15/44* (2006.01)
  *F01D 19/00* (2006.01)
  *F01D 25/22* (2006.01)
  *F01D 11/00* (2006.01)
  *F01D 11/02* (2006.01)

(52) U.S. Cl.
  CPC ............ *F01D 25/04* (2013.01); *F01D 25/22* (2013.01); *F16J 15/44* (2013.01); *F16J 15/442* (2013.01); *F05D 2240/53* (2013.01); *F05D 2260/85* (2013.01); *F05D 2260/96* (2013.01)

(58) Field of Classification Search
  CPC .......... F01D 19/00; F16J 15/442; F16J 15/44; F02C 7/28; F05D 2240/53; F05D 2260/85; F05D 2260/96
  USPC ........... 415/1, 119; 416/146 A, 174; 277/411
  See application file for complete search history.

(56) References Cited

U.S. PATENT DOCUMENTS

| | | |
|---|---|---|
| 2003/0202876 A1 | 10/2003 | Jasklowski et al. |
| 2008/0265513 A1 | 10/2008 | Justak |
| 2011/0121519 A1 | 5/2011 | Justak |

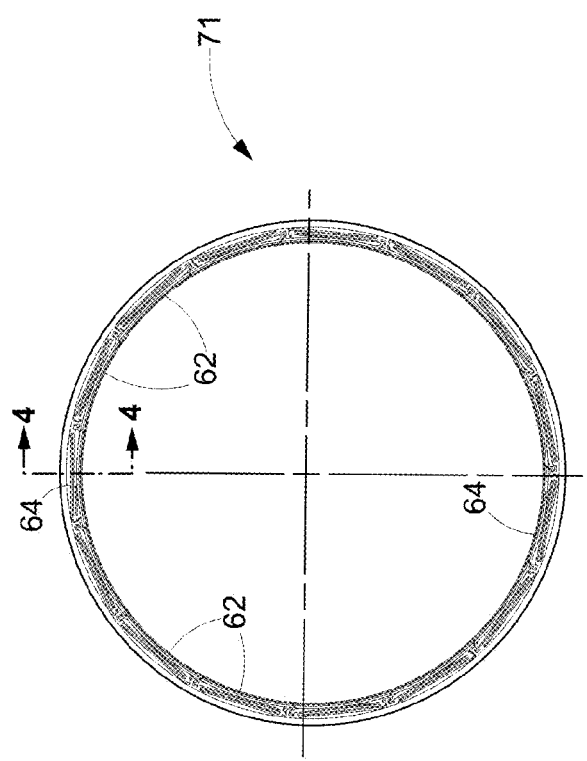
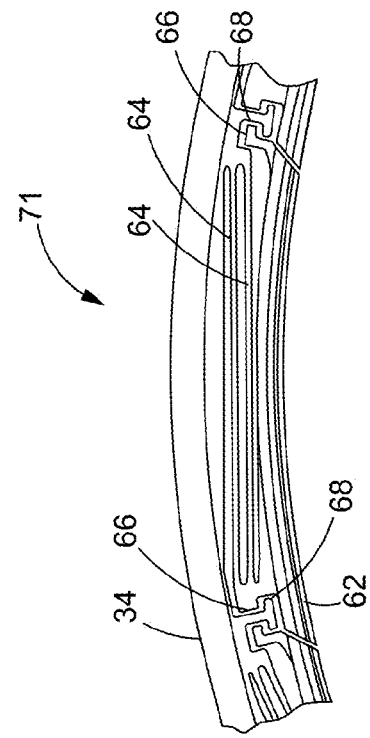
FIG. 2
FIG. 3

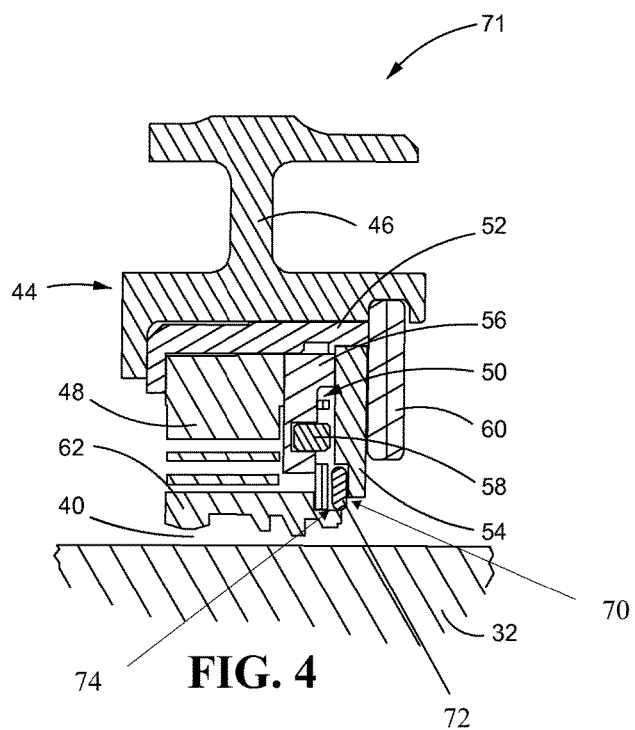
FIG. 4
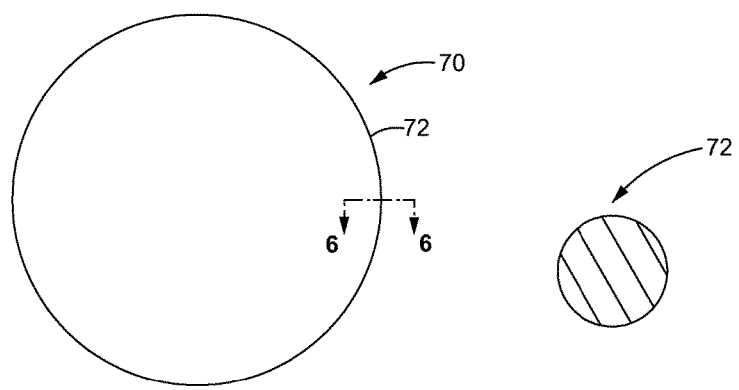
FIG. 5
FIG. 6

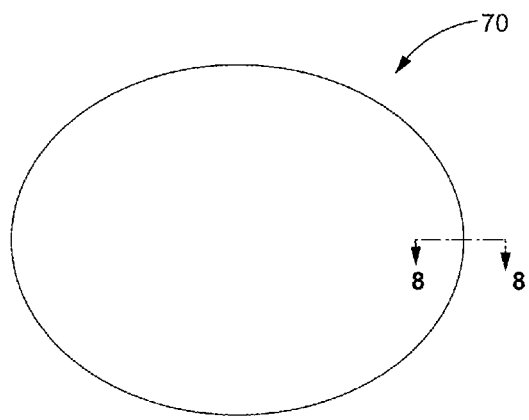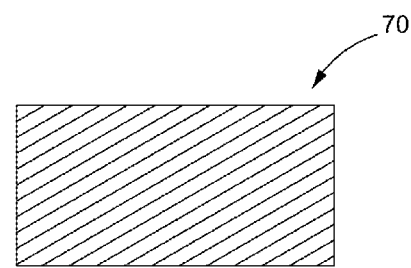
FIG. 7     FIG. 8
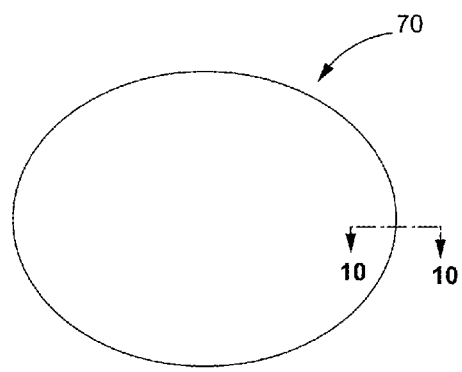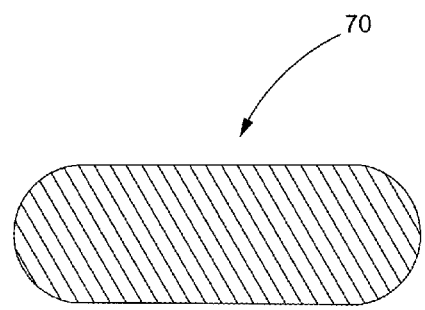
FIG. 9     FIG. 10

VIBRATION DAMPING APPARATUS FOR HYDROSTATIC SEAL OF GAS TURBINE ENGINE

CROSS-REFERENCE TO RELATED APPLICATION

This patent application is a US National Stage under 35 U.S.C. § 371, claiming priority to International Application No. PCT/US2013/75978 filed on Dec. 18, 2013, which claims priority under 35 U.S.C. § 119(e) to U.S. Patent Application Ser. No. 61/800,075 filed on Mar. 15, 2013.

FIELD OF THE DISCLOSURE

The present disclosure generally relates to gas turbine engines and, more particularly, relates to vibration damping apparatus for seal assemblies of gas turbine engines.

BACKGROUND OF THE DISCLOSURE

With a gas turbine engine, a number of different components rotate relative to fixed components under extremely tight tolerances. For example, the compressor and turbine sections of a gas turbine engine include radially outwardly extending blades, which collectively form a rotor. Such rotors rotate relative to a fixed engine case which forms a stator, with a very small annular gap between the rotor and stator. To increase the efficiency and operation of the gas turbine engine, it is important that such gaps be maintained so as to allow for proper rotation, but do so at as small a dimension as necessary to limit air leakage through the gap.

In order to minimize leakage through such gaps, seals are employed in gas turbine engines. Such seals can be contacting seals such as labyrinth or brush seals, or non-contacting seals such as hydrostatic seals. While labyrinth seals can be effective they require that all parts be manufactured and maintain at extremely tight tolerances, and can generate significant amounts of heat at the knife edge and seal rub interface. Brush seals can also be effectively, but can be prone to coking and are largely uni-directional in their sealing capability. Hydrostatic seals, on the other hand, employ a plurality of circumferentially spaced shoes extending from spring elements mounted to the stator. Such spring biased movement afforded to the shoes enables the gap between the rotor and stator to be properly maintained at all times as the velocity of the air flowing through the gap increases and decreases.

While hydrostatic seals are effective, as gas turbine engine are subjected to extreme temperature ranges from start-up through maximum speed, particularly in the hot sections of the engine such as the turbine and diffuser, significant vibrations in the seal can be encountered. Such vibrations may be particularly harsh during engine cold starts, wherein the seals can become damaged by such vibrations, in some cases to the extent that overall sealing effectiveness may be compromised.

It can therefore be seen that apparatus for damping such vibrations in hydrostatic seals of gas turbine engines are needed.

SUMMARY OF THE DISCLOSURE

In accordance with one aspect of the disclosure, a hydrostatic seal and vibration damping assembly for a gas turbine engine is disclosed. The assembly may comprise a hydrostatic seal having a shoe, and a vibration damping apparatus operatively associated with the shoe, wherein the vibration damping apparatus has a different coefficient of thermal expansion than the hydrostatic shoe.

In a refinement, the vibration damping apparatus may be annular in shape.

In another refinement, the vibration damping apparatus is oval in shape.

In another refinement, the vibration damping apparatus is a discontinuous loop.

In yet another refinement, the vibration damping apparatus comprises an Inconel material.

In another refinement, the vibration damping apparatus is an Inconel 718 material.

In another refinement, the vibration damping apparatus has a circular cross-section.

In another refinement, the vibration damping apparatus has a rectangular cross-section.

In yet another refinement, the vibration damping apparatus has an extended oval cross-section.

In another refinement, the vibration damping apparatus is positioned against a radially outer diameter of the shoe.

In accordance with another aspect of the disclosure, a gas turbine engine is disclosed. The engine may comprise a stator, a rotor rotating within the stator and defining a circumferential gap therebetween, a hydrostatic seal positioned within the circumferential gap and including a plurality of spring-biased shoes; and a vibration damping apparatus operatively associated with the hydrostatic seal to limit vibrations of the shoe.

In a refinement, the vibration damping apparatus is formed so as to engage the shoe and limit vibration of the shoes during a cold start-up of the gas turbine engine, and disengage from the shoe after the gas turbine engine reaches an operational temperature.

In a refinement, the vibration damping apparatus is manufactured from a material having a different coefficient of thermal expansion than the shoes.

In another refinement, the vibration damping apparatus is one of circular and oval in shape.

In another refinement, the vibration damping apparatus is a discontinuous loop.

In yet another refinement, the vibration damping apparatus comprises an Inconel material.

In another refinement, the vibration damping apparatus comprises an Inconel 718 material.

In another refinement, the vibration damping apparatus has one of a circular, rectangular, and extended oval cross-section.

In yet another refinement, the hydrostatic seal further comprises a spacer plate and a front plate which cooperate with the shoe to define a channel, and the vibration damping apparatus is positioned within the channel.

In accordance with yet another aspect of the disclosure, a method of damping vibrations in a hydrostatic seal of a gas turbine engine is disclosed. The method may comprise positioning a hydrostatic seal between a rotor and a stator of the gas turbine engine, extending a shoe of the hydrostatic seal into a gap between the rotor and the stator, engaging the shoe with a vibration damping apparatus when the gas turbine engine initiates a cold start-up, and disengaging the shoe from the vibration damping apparatus when the gas turbine engine reaches an operational temperature.

In a refinement, the hydrostatic seal further includes a front plate and spacer plate which cooperate to form a channel, and the method further includes positioning the vibration damping apparatus within the channel.

In another refinement, the method further includes manufacturing the vibration damping apparatus from a material having a different coefficient of thermal expansion than the shoe.

In another refinement, the method further includes manufacturing the vibration damping apparatus from an Inconel material.

These and other aspects and features of the present disclosure will be better understood in light of the following detailed description when read in light of the accompanying drawings.

BRIEF DESCRIPTION OF THE DRAWINGS

FIG. 2 is a plan view of a hydrostatic seal and vibration damping apparatus of the gas turbine engine of FIG. 1, and constructed in accordance with the teachings of this disclosure;

FIG. 3 is a fragmentary plan view of one section of the hydrostatic seal and vibration damping apparatus of FIG. 2;

FIG. 4 is a cross-sectional view of the hydrostatic seal and vibration damping apparatus of FIG. 2 taking along line 4-4 of FIG. 2;

FIG. 5 is a plan view of one embodiment of a vibration damping apparatus constructed in accordance with the teachings of this disclosure;

FIG. 6 is a cross-sectional view of the vibration damping apparatus of FIG. 5, taken along line 6-6 of FIG. 5;

FIG. 7 is a plan view of a second embodiment of a vibration damping apparatus constructed in accordance with the teachings of this disclosure;

FIG. 8 is a cross-sectional view of the vibration damping apparatus of FIG. 7, taken along line 8-8 of FIG. 7;

FIG. 9 is a plan view of a third embodiment of a vibration damping apparatus constructed in accordance with the teachings of this disclosure;

FIG. 10 is a cross-sectional of the vibration damping apparatus of FIG. 9, taken along line 10-10 of FIG. 9.

It should be understood that the drawings are not to scale, and that the disclosed embodiments are illustrated only diagrammatically and in partial views. It should also be understood that this disclosure is not limited to the particular embodiments illustrated herein.

DETAILED DESCRIPTION

Figure 1:
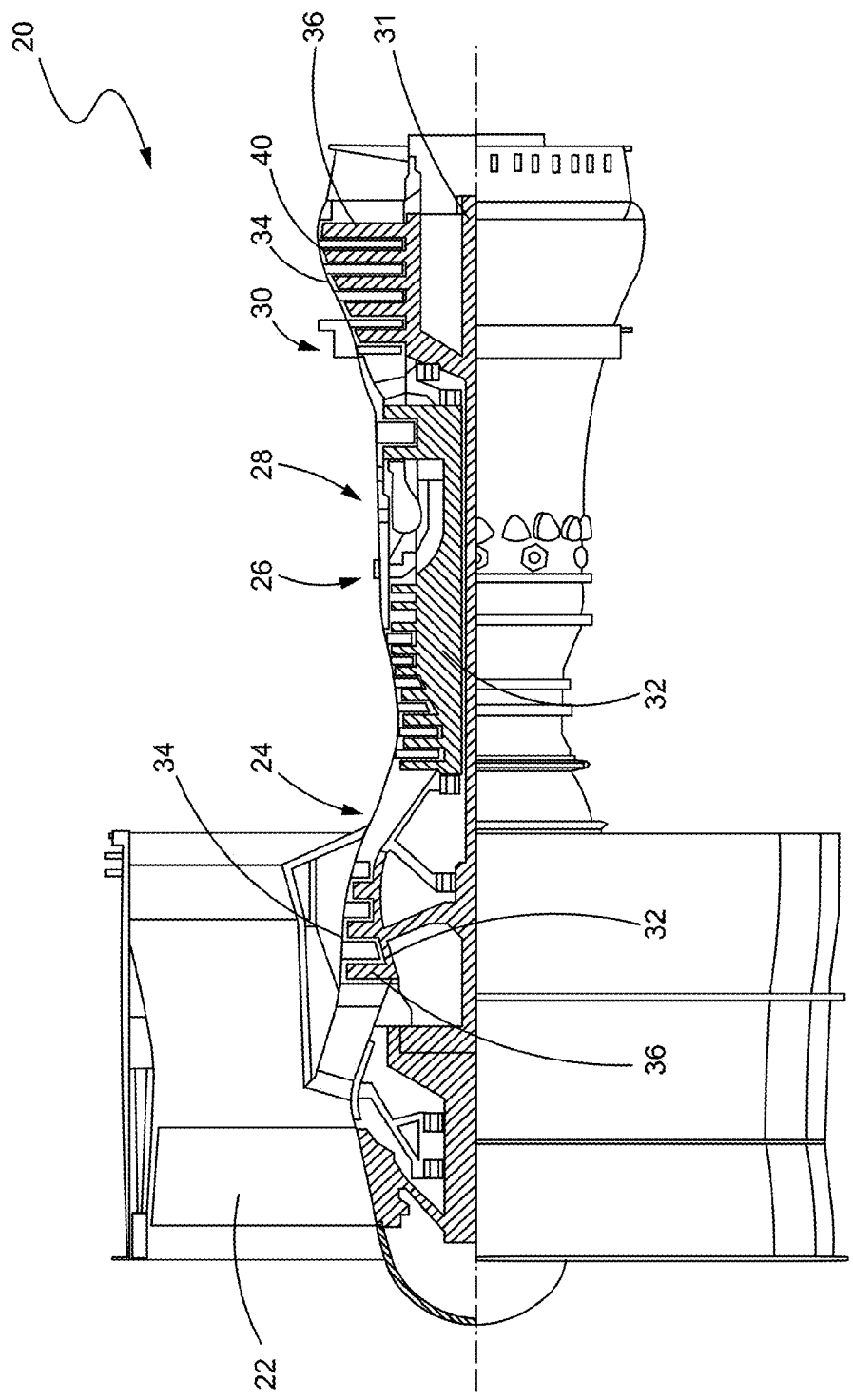
FIG. 1 is a side cross-sectional view of a gas turbine engine constructed in accordance with the teachings of this disclosure.

Referring now to the drawings, and with initial reference to FIG. 1, a gas turbine engine constructed in accordance with the teachings of the present disclosure is generally referred to reference numeral 20. As shown, the gas turbine engine 20 includes a fan 22, a compressor 24, a diffuser 26, a combustor 28, and a turbine 30 axially aligned along a longitudinal shaft(s) 31. As the functionality of a gas turbine engine is well known to those of ordinary skill in the art, its operation will not be discussed in detail herein. However, it is important to note, that the engine 20 includes a number of rotors 32 rotating within fixed stators 34. For example, as shown, the compressor 24 and turbine 30 include a plurality of radially outwardly extending blades 36 which collectively form rotors 32, which rotate within sections of an engine case 38, forming stators 34.

To allow the rotors 32 to rotate within the stators 34, circumferential air gaps 40 are maintained therebetween as shown in FIGS. 1 and 4. Moreover, in order to limit leakage of air through the gap 40, a hydrostatic seal 44 such as the one shown in FIGS. 2 and 3, is operatively associated with each gap 40. As shown in FIG. 4, the hydrostatic seal 44 includes a seal carrier or housing 46 mounted directly to the stator 34. The seal carrier 46 holds a main or primary seal 48, along with a secondary seal 50 situated downstream of the primary seal 48. A seal cartridge 52 is employed to encapsulate and support the main or primary seal 48 and secondary seal 50 in a single structure for ease of manufacture and/or installation.

A front plate 54 is adapted to secure the primary and secondary seals 48, 50 within the cartridge 52. The front plate 54 may be threadedly or otherwise secured to the cartridge 52 in a manner that permits the front plate 54 to maintain tight securement and positioning of both the primary and secondary seals 48, 50, respectively.

In order to maintain the integrity of the primary and secondary seals 48, 50 within the seal cartridge 52, a spacer plate 56 is adapted to assure independent operation of the primary seal 48 and the secondary seal 50, even though the two may be relatively tightly axially juxtaposed by the front plate 54. In the disclosed embodiment, an anti-rotation pin 58 is adapted to constrain the secondary seal 50 against any relative rotation within the seal cartridge 52. A retaining ring 60, axially secured against the front plate 54, assures a tertiary retention aspect for the fully assembled seal cartridge 52, i.e. to assure containment of the primary and secondary seals 48, 50, within the seal carrier 46.

In the disclosed embodiment, the primary seal 48 is a hydrostatic non-contacting seal, having a plurality of circumferentially spaced and segmented shoes 62. As shown best in FIGS. 2 and 3, the shoes 62 are integral with the primary seal 48 by way of spring elements 64. Employing such a spring-biased arrangement, the shoes 62 are adapted to hydrostatically float relative to the gap 40 between the shoes 62 and the rotor 32. More specifically, as the seal carrier 46 is mounted to the stator 34, a limit to the radially outer movement of the shoes 62 is provided. To limit the radially inner movement of the shoes 62, one or more arms 66 are provided which are adapted to engage shoulders 68. In so doing, the shoes 62 cannot completely close the gap 40 and detrimentally engage the rotor 32.

In order to limit the vibration of the shoes 62, the present disclosure provides a vibration damping apparatus 70 in operative association with the hydrostatic seal 44. The vibration damping apparatus 70, when mounted to the hydrostatic seal 44, collectively form a hydrostatic seal and vibration damping assembly 71. In the depicted embodiment of FIG. 5, the vibration damping apparatus 70 is provided in the form of a vibration control ring or annulus 72, but in the embodiments of FIGS. 7-10, non-circular shapes, such as but not limited to, ovals and non-continuous loops are possible, as will be described in further detail herein.

As shown best in FIG. 4, the vibration damping apparatus 70 is situated within a channel 74 defined between the shoe 62, the spacer plate 56, and the front plate 54. Alternatively, the vibration control ring 72 may be situated on the radially inner, rather than radially outer, circumference of the shoe 62. The vibration control ring 72 can be effective to dampen vibrations, and/or particularly undesirable resonance modes thereof, that can occur during engine operation, especially during cold engine startups, as may be appreciated by those skilled in the art.

More specifically, within hot sections of gas turbine engines, hydrostatic seals may be particularly sensitive to cold start vibrations; i.e. vibrations incurred prior to the full thermal expansion of parts achieved at hot section operating temperatures. During periods of rising temperatures, i.e. from cold start to normal operating temperatures, the vibration control ring 72 provides damping to protect the shoes 62, while becoming essentially inert at normal gas turbine engine operating temperatures. This may be accomplished by manufacturing the vibration control ring 72 from a material having coefficient of thermal expansion which is higher than the coefficient of thermal expansion of the hydrostatic seal 44. For example, a nickel alloy may provide a relatively high coefficient of thermal expansion, permitting the vibration control ring 72 to expand rapidly upon startup for providing immediate damping from ambient temperature up through about 200 degrees Fahrenheit. In so doing, when cold, e.g, at engine start-up, the vibration control ring 72 engages the shoes 62 and limits vibration thereof. Beyond about 200° F., however, the vibration control ring 72 expands away from the shoes 62 and offers no functional input, i.e., neither benefit nor burden.

In other embodiments, the vibration damping apparatus 70 may be manufactured from other materials including, but not limited to, an Inconel material such as Inconel 718. It should be noted, in addition, that the vibration damping apparatus 70 does not need to be manufactured from a material having a higher coefficient of thermal expansion than the hydrostatic seal 44, and that it is the difference in thermal expansion coefficients between the two components that provides the benefit. Depending on the geometry and the environmental conditions at which the vibrations occur, the material of the vibration damping apparatus could be selected such that its thermal expansion coefficient otherwise alters its geometry sufficiently to damp vibrations.

Referring now to FIGS. 5 and 6, a first embodiment of the disclosed vibration damping apparatus 70 is presented. In this embodiment, the vibration damping apparatus 70 is comprised of the continuous vibration control ring or annulus 72. In such an embodiment, as shown in FIG. 6, the vibration control ring 72 has a circular shape in cross-section as well, but other cross-sectional shapes as will be described in further detail below are possible as well. The circular cross-section may provide particular flexibility benefits with respect to manufacture and/or installation of the vibration control ring 72 in the hydrostatic seal 44.

A second embodiment of the vibration damping apparatus 70 is depicted in FIGS. 7 and 8. As disclosed, the vibration damping apparatus 70 may be elliptical in shape. Such an elliptical shape may offer a resilient biasing force to facilitate initial tolerance control, for example. In such an embodiment, the vibration damping apparatus 70 may have a rectangular shape in cross-section as shown in FIG. 8, but other cross-sectional shapes such as the aforementioned circular shape are possible in such an embodiment as well. Such a rectangular cross-section may provide particular benefits with respect to damping within some hydrostatic seals 44 that may be subjected to particular vibrational harmonics or resonance modes, for example.

FIGS. 9 and 10 depict a third embodiment of the vibration damping apparatus 70 comprised of a discontinuous loop. The loop may, also have an elliptical shape for reasons already provided with respect to the second embodiment, or may be ring-like or annular as with the first embodiment. The discontinuity of the vibration damping apparatus 70 may facilitate installation thereof within the hydrostatic seal 44, for example. In such an embodiment, the vibration damping apparatus 70 may have an elongated oval cross-section. Such a cross-sectional shape may provide particular benefits for damping within some hydrostatic seals 44 to accommodate certain geometrical challenges with respect to spacing, as one example. Of course the cross-sectional shape of the discontinuous loop embodiment may be circular or rectangular as well.

Beyond the geometries and cross-sectional shapes of the vibration damping apparatus 70 presented above, numerous and various other geometries and/or shapes, including cross-sections, may fall within the spirit and scope of this disclosure.

Figure 11:
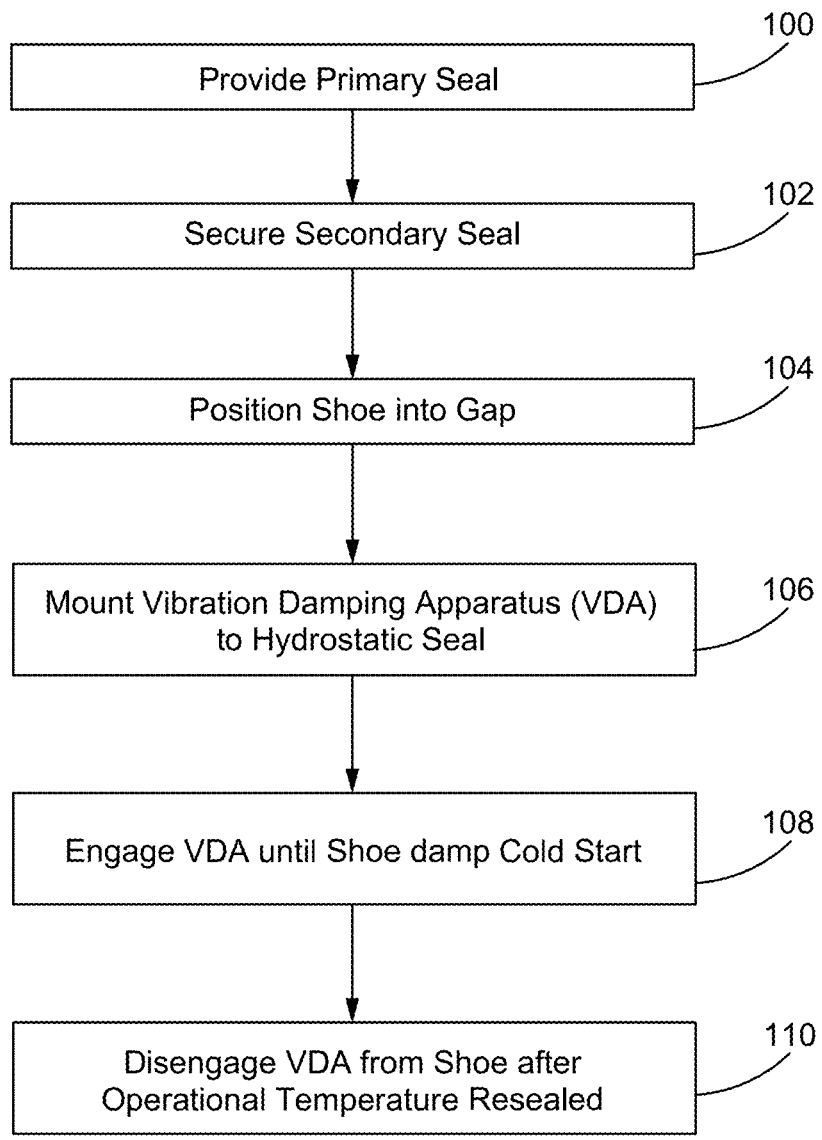
FIG. 11 is a flowchart depicting a sample sequence of steps which may be practiced in accordance with the present disclosure.

An exemplary method of damping vibrations in a hydrostatic seal adapted for use in gas turbine engines 20 is depicted in flow chart format in FIG. 11. As shown, the method may include a first step 100 of providing the primary seal 48. In a second step 102, the secondary seal 50 may be secured to the primary seal 48 in an axially juxtaposed orientation. In a third step 104, the sealing shoe 62 may be positioned radially inwardly of the primary and secondary seals 48, 50, to provide a hydrostatic sealing gap 40 with relative to the rotor 32. The vibration damping apparatus 70 is then mounted within the hydrostatic seal 44, as shown in a step 106. Since the vibration damping apparatus 70 has a coefficient of expansion greater than the shoe 62, during cold start-up of the engine 20, the vibration damping apparatus 70 engages the shoe 62 and limits vibration thereof during a step 108. However, as the vibration damping apparatus 70 heats up, it expands at a different rate than the shoe 62 and thus separates from the shoe 62 when the engine 20 reaches an operating temperature, as indicated in a step 110.

INDUSTRIAL APPLICABILITY

From the foregoing, it may be appreciated that the technology disclosed herein may have industrial applicability in a variety of settings, such as, but not limited to, damping enhancements that may protect hydrostatic seals, such as shoes used in gas turbine engine hydrostatic seals, during cold startups.

Indeed, such technology may be expanded in some cases to provide for either continuous or intermittent damping, depending on particular system requirements. For example, for continuous damping the vibration damping apparatus may be made of the same material as the base material of the hydrostatic seal to provide for suitable pairing under thermal growth. In such cases, the fit of the control ring relative to the shoes could be sized to permit only controlled relative movements, for example, by restricting deflections greater than a set or predetermined threshold.

In environments requiring intermittent damping, the vibration damping apparatus material may be selected to control damping at desired operating conditions, based on relative growth of associated parts. As one example, a gas turbine engine hydrostatic seal made of a nickel-chromium super alloy material may require damping from ambient or cold start temperature, up through about 200-300 degrees Fahrenheit. If such a seal were damped by a vibration damping apparatus formed of, for example, an Inconel 718 alloy, the vibration damping apparatus would have a relatively higher coefficient of thermal expansion. As the seal heats up, the vibration damping apparatus thus expands away from the shoes to avoid contact/damping at temperatures in a normalized range, or at steady-state operating temperatures, of the hot section of a gas turbine engine. In other instances, in which damping may be desired at higher temperatures rather than low temperatures, reverse material

What is claimed is:

1. A hydrostatic seal and vibration damping assembly for a gas turbine engine, comprising:
   a hydrostatic seal having a shoe; and
   a vibration damping apparatus operatively associated with the shoe, the vibration damping apparatus having a different coefficient of thermal expansion than the hydrostatic shoe, wherein the hydrostatic seal further comprises a spacer plate and a front plate which cooperate with the shoe to define a channel, and wherein the vibration damping apparatus is positioned within the channel and the vibration damping apparatus engages the shoe and limit vibrations of the shoe during a cold start-up of the gas turbine engine, and wherein the vibration damping apparatus disengages from the shoe after the gas turbine engine reaches an operational temperature.

2. The hydrostatic seal and vibration damping assembly of claim 1, wherein the vibration damping apparatus is annular in shape.

3. The hydrostatic seal and vibration damping assembly of claim 1, wherein the vibration damping apparatus is one of an oval in shape or a discontinuous loop.

4. The hydrostatic seal and vibration damping assembly of claim 1, wherein the vibration damping apparatus comprises an Inconel material.

5. The hydrostatic seal and vibration damping assembly of claim 4, wherein the vibration damping apparatus comprises an Inconel 718 material.

6. The hydrostatic seal and vibration damping assembly of claim 1, wherein the vibration damping apparatus has a circular cross-section.

7. The hydrostatic seal and vibration damping assembly of claim 1, wherein the vibration damping apparatus has a rectangular cross-section.

8. The hydrostatic seal and vibration damping assembly of claim 1, wherein the vibration damping apparatus has an extended oval cross-section.

9. The hydrodynamic seal and vibration damping assembly of claim 1, wherein the vibration damping apparatus is positioned against a radially outer diameter of the shoe.

10. A gas turbine engine, comprising:
    a stator;
    a rotor rotating within the stator and defining a circumferential gap therebetween;
    a hydrostatic seal and a vibration damping assembly, the hydrostatic seal being positioned within the circumferential gap and including a plurality of spring biased shoes and wherein the vibration damping apparatus is operatively associated with the hydrostatic seal to limit vibrations of the plurality of spring biased shoes, wherein the vibration damping assembly has a different coefficient of thermal expansion than the plurality of spring biased shoes, and wherein the hydrostatic seal further comprises a spacer plate and a front plate which cooperate with the plurality of spring biased shoes to define a channel, and wherein the vibration damping apparatus is positioned within the channel and the vibration damping apparatus engages the plurality of spring biased shoes and limits vibrations of the plurality of spring biased shoes during a cold start-up of the gas turbine engine, and wherein the vibration damping apparatus disengages from the plurality of spring biased shoes after the gas turbine engine reaches an operational temperature.

11. The gas turbine engine of claim 10, wherein the vibration damping apparatus is one of circular and oval in shape.

12. The gas turbine engine of claim 10, wherein the vibration damping apparatus is a discontinuous loop.

13. The gas turbine engine of claim 10, wherein the vibration damping apparatus comprises an Inconel material.

14. The gas turbine engine of claim 13, wherein the vibration damping apparatus comprises an Inconel 718 material.

15. The gas turbine engine of claim 10, wherein the vibration damping apparatus has one of a circular, rectangular and extended oval cross-section.

16. A method of damping vibrations in a hydrostatic seal of a gas turbine engine, comprising:
    positioning a hydrostatic seal between a rotor and stator of the gas turbine engine;
    extending a shoe of the hydrostatic seal into a gap between the rotor and the stator;
    engaging the shoe with a vibration damping apparatus when the gas turbine engine initiates a cold start-up; and
    disengaging the shoe from the vibration damping apparatus when the gas turbine engine reaches an operational temperature, wherein the hydrostatic seal further includes a front plate and a spacer plate which cooperate with the shoe to form a channel, and wherein the method further includes positioning the vibration damping apparatus within the channel and wherein the vibration damping apparatus is formed from a material having a different coefficient of thermal expansion than the shoe.

17. The method of claim 16, further including manufacturing the vibration damping apparatus from an Inconel material.

* * * * *